UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BLACK DISAZO DYE.

SPECIFICATION forming part of Letters Patent No. 644,235, dated February 27, 1900.

Application filed October 17, 1898. Serial No. 693,799. (Specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in the Manufacture of Black Disazo Dyes, of which the following is a specification.

In previous applications for Letters Patent, Serial Nos. 690,649, 690,650, and 690,651, filed September 10, 1898, I have described secondary disazo dyes derived from ortho-nitro-ortho-amido-phenol-sulfo-acid, and in an application of even date herewith I describe such dyes derived from para-nitro-ortho-amido-phenol-ortho-sulfo-acid.

The present invention relates to new disazo dyes derived from a new nitro-amido-phenol-sulfo-acid which I have discovered. The said new nitro-amido-phenol-sulfo-acid is probably an ortho-nitro-para-amido-phenol-ortho-sulfo-acid, and although I make no claim to the manufacture of this new acid in this application I describe a method of producing it, because no description has hitherto been published.

I have found that by nitrating the ortho-sulfo-acid of para-amido-phenol the new nitro-amido-phenol-sulfo-acid is obtained. The following example will serve to illustrate this manufacture of my initial material:

Add about seven hundred and fifty-six (756) parts of para-amido-phenol-ortho-sulfo-acid while stirring to about three thousand two hundred (3,200) parts of concentrated sulfuric acid (containing about ninety-five per cent. real $H_2SO_4$) at the ordinary temperature. When this is dissolved, cool the mixture to a temperature of about minus 5° centigrade. Then add slowly a cool mixture of about four hundred (400) parts of nitric acid (containing about sixty-two per cent. $HNO_3$) and of about four hundred (400) parts of sulfuric acid mono-hydrate, ($H_2SO_4$,) taking care that the temperature remains always below 0° centigrade. When the mixing is effected, pour the nitration mixture onto ice, wash the separated nitro-acid well with cold water, press, and dry. The nitro-amido-sulfo-acid so obtained is nearly insoluble in alcohol and in cold water. It dissolves a little more readily in boiling water, giving a red-colored solution, and crystallizes out from this in the form of brilliant pale-reddish-brown-colored needles. It yields a mono- and a disodium salt; the first dissolves very readily in water, giving a deep-red color. From each solution after the addition of mineral acid the free acid gradually separates out again in the form of crystals. I use this new sulfo-acid for the manufacture of my new secondary disazo dyestuffs. These new dyestuffs possess great strength of coloring power and an excellent fastness to light. They give black shades on wool and similar animal fiber, and when the dyed fabrics are treated with chromates shades very fast to washing and fulling are obtained, and at the same time the color is changed toward green or deep black.

In the present application I desire to claim, generically, the new disazo dyes from ortho-nitro-para-amido-phenol-ortho-sulfo-acid and a-naphthylamin or the 1.6 or 1.7 alpha-naphthylamin-sulfo-acids known as "Cleve's," either separate or as a mixture, as middle components and alpha-naphthol-alpha-sulfo-acid, (1.4 or 1.5,) beta-naphthol, beta-napthol-disulfo-acid R. 1.8-dioxy-naphthalene-sulfo-acids, and alpha- and beta-naphthylamin and the alkyl derivatives thereof as end components, and specifically I wish to claim the disazo dye from the new nitro-amido-phenol-sulfo-acid and Cleve's alpha-naphthylamin-sulfo-acid as middle component and alpha-naphthol-alpha-sulfo-acid (1.4 or 1.5) as end component.

The following examples will serve to illustrate the manner in which my invention can best be carried into practical effect and my new group of dyes obtained. The parts are by weight.

*Example 1—Combination of the new nitro-amido-phenol-sulfo-acid with the Cleve's alpha-naphthylamin-sulfo-acid.*—Dissolve about two hundred and thirty-four (234) parts of ortho-nitro-para-amido-phenol-ortho-sulfo-acid while adding two hundred and thirty (230) parts of caustic soda (containing about thirty-five per cent. real Na.O.H) in about two thousand (2,000) parts of water and add a concentrated solution of about seventy (70) parts of sodium nitrite. Add the mixture while stirring to about four hundred and fifty (450) parts of hydrochloric acid, (containing about thirty per cent. HCl,) which previously has been diluted with about one thousand (1,000) parts of water. The diazotation is usually finished in a few minutes. Then pour the solution of the diazo compound into a solution of two hundred and fifty (250) parts of the sodium salt of the 1-naphthylamin-6-and-7-sulfo-acid (Cleve's acid) in ten times the quantity of water. Stir and maintain at a temperature of about 50° centigrade. Cool for about ten hours, filter the dyestuff, precipitate, press, and dry. The precipitate is usually in the form of bronze-luster crystals, which are difficultly soluble in water.

*Example 2—Production of the coloring-matter ortho-nitro-para-amido-phenol-ortho-sulfoacid and Cleve's alpha-naphthylamin-sulfoacid and alpha-naphthol-alpha-sulfoacid, (1.4 or 1.5.)*—Dissolve about nine hundred and eighty (980) parts of the intermediate product obtained in the manner hereinbefore described in Example 1 in about thirty thousand (30,000) parts of boiling water containing about four hundred and sixty (460) parts of caustic soda lye, (containing about thirty-five per cent. real Na.O.H.) Cool very carefully down to about 0° centigrade and add to the solution a concentrated solution of one hundred and forty (140) parts sodium nitrite. Pour the mixture, while stirring and continuing to cool, as described, into one thousand (1,000) parts of hydrochloric acid (containing about thirty per cent. HCl) which has been diluted with about two thousand (2,000) parts of water. A green solution is obtained, which on the addition of much mineral acid becomes yellowish brown, on strongly diluting with water, or on the addition of sodium acetate or soda it becomes deep-bluish violet. Pour the disazo compound so obtained into a concentrated soda alkaline solution of four hundred and ninety-five (495) parts of sodium salt of alpha-naphthol-alpha-sulfo-acid, (1.4 or 1.5.) The combination is quickly finished, and the precipitated dyestuff is filtered and treated in the ordinary manner.

The production of the other combinations mentioned as constituting the new group of coloring-matters is effected in a similar manner.

My new group of coloring-matters are generally made in the form of a dark-colored powder and are characterized particularly by their behavior on reduction. To test the coloring-matter, dissolve or suspend one (1) part in about one hundred (100) parts of hot water and add about fifteen (15) parts of twenty per cent. ammonia solution. Boil up after adding five (5) parts of freshly-prepared sulfid of ammonia solution. The deep-blue color of the solution changes to brownish red, and if a spot of the solution on filter-paper be treated with hydrochlorid acid the color turns to violet-red. Boil for about twenty-five (25) minutes and add a further quantity of two (2) parts of sulfid of ammonia solution. Continue heating until on repeating the test on filter-paper the weak-brown-colored spot only changes but slightly toward red on treatment with hydrochloric acid. Cool the liquid, add an excess of hydrochloric acid, and diazotize with sodium nitrite solution. Filter this diazo solution and pour it slowly into a solution of about three (3) parts amido-naphthol-di-sulfo-acid-H. Dissolve in about one hundred and twenty (120) parts of a carbonate of soda solution (containing about twelve (12) parts $Na_2CO_3$.) A violet-blue coloring-matter forms immediately, which has the characteristic property of changing on treatment with glacial acetic acid to a cherry-red and with hydrochloric acid to a light red, which very readily changes to dirty brown. In this reduction the ortho-nitro-para-amido-phenol-ortho-sulfo-acid is regenerated, diazotized, and converted into characteristic coloring-matter with amido-naphthol-di-sulfo-acid-H.

The specific coloring-matter which I desire to claim in these Letters Patent behaves on reduction exactly as described for the whole group of coloring-matters and is further characterized by its being readily soluble in water and giving a blue-green solution in concentrated sulfuric acid. The coloring-matter on solution in one thousand times its weight of water yields a blue solution, the color of which is practically unchanged when seen in bulk by the addition of a little caustic soda. Hydrochloric acid turns this blue solution to crimson or red, and addition of ferric chlorid produces a brown-red to brown precipitate.

What I claim is—

1. As a new product disazo coloring-matters which can be obtained from ortho-nitro-para-amido-phenol-ortho-sulfo-acid and which yield ortho-nitro-para-amido-phenol-ortho-sulfo-acid on reduction with ammonium sulfid in ammoniacal solution, all as hereinbefore described.

2. As a new product the new disazo coloring-matter which can be derived from ortho-nitro-para-amido-phenol-ortho-sulfo-acid and the Cleve's alpha-naphthylamin-sulfo-acid as middle component, alpha-naphthol-alpha-sulfo-acid (1.4-1.5) as end component, and which yields ortho-nitro-para-amido-phenol-ortho-sulfo-acid on reduction with ammonium sulfid in ammoniacal solution, and by being readily soluble in water and soluble in concentrated sulfuric acid, giving a blue-green solution, and giving with water a blue solution the color of which on the addition of a little caustic soda is practically unchanged when seen in bulk, hydrochloric acid turning this blue solution to crimson or red and addition of ferric chlorid producing a brown-red to brown precipitate, all substantially as hereinbefore described.

In testimony whereof I have hereunto set my hand in the presence of two subscribing witnesses.

PAUL JULIUS.

Witnesses:
ERNEST F. EHRHARDT,
HOWARD E. J. INGLEY.